Oct. 30, 1951      I. ROSSI ET AL      2,573,111
BOTTLE CAP
Original Filed July 12, 1944
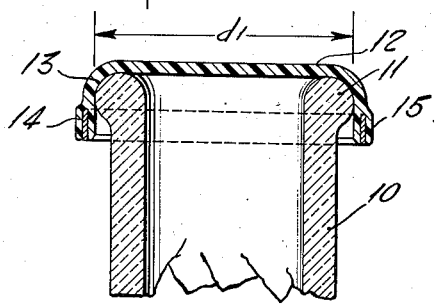
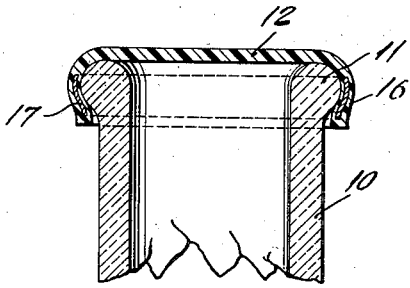
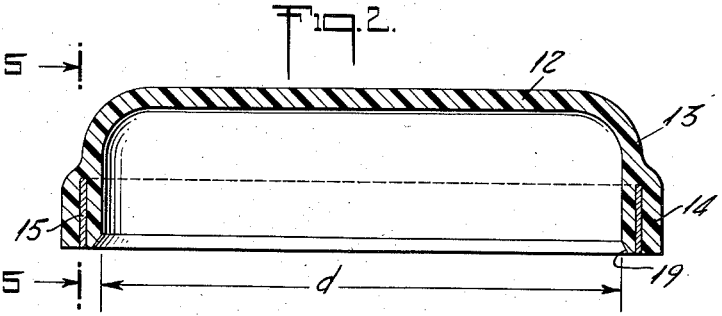
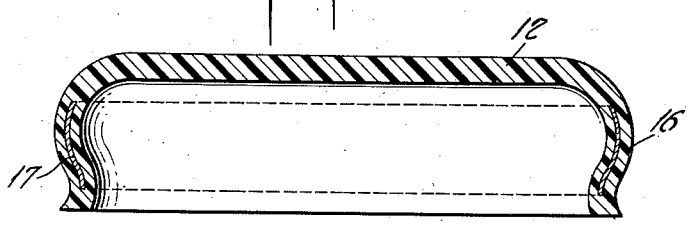
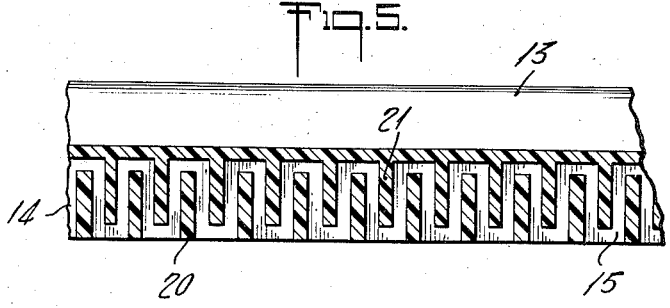
INVENTORS
IRVING ROSSI & WILLIAM DUBILIER
BY
ATTORNEY Patented Oct. 30, 1951

2,573,111

UNITED STATES PATENT OFFICE 2,573,111

BOTTLE CAP

Irving Rossi, West Orange, N. J., and William Dubilier, New Rochelle, N. Y.

Original application July 12, 1944, Serial No. 544,614, now Patent No. 2,445,889, dated July 27, 1948. Divided and this application July 19, 1948, Serial No. 39,433

4 Claims. (Cl. 215—41)

This application is a division carved out from application Serial Number 544,614, filed July 12, 1944, entitled "Thermoplastic Devices," now Patent No. 2,445,889, dated July 27, 1948.

The present invention relates to resilient bottle caps or closures, more particularly to devices of this type made of a synthetic composition such as of thermosetting or thermoplastic material.

Synthetic composition materials, such as polymerization or condensation products or thermoplastics, are both cheap and attractive and can be easily formed or molded to any desired shape. Their use has, however, been limited in the past to such cases where only a limited mechanical strength and resiliency were required, due to their low elastic limit, to their fatigue resistance or creep recovery and lack of other necessary or desirable mechanical characteristics. In particular, if subjected to tensile stress, the material would follow only slowly and gradually the applied force or removal of such force, thus making its use impractical and prohibitive for many applications where a quick-acting spring action free from fatigue effects and other desirable mechanical characteristics such as high strength were required.

Accordingly, among the objects of the present invention is to generally improve the mechanical characteristics of bottle caps or similar closure devices made of synthetic composition material; to increase the mechanical strength of a cap or closure device of this type; and to impart additional resiliency or quick-acting spring action to such caps in the perispherical direction.

The composition materials useful for the invention may be of any of the class of known synthetic products, such as aldehyde condensation products, cellulose derivatives, vinyl resins, acrylite or methacrylite resins, polystyrene or polyamide plastics (the latter being well known under the trade name of nylon on the market) and similar synthetic plastic or thermoplastic materials known in the art.

The invention will become more apparent from the following detailed description taken in reference to the accompanying drawings forming part of this specification and wherein:

Figure 1 is a cross-section through a bottle neck with a closure cap applied thereto and constructed in accordance with the invention;

Figure 2 is an enlarged cross-sectional view of the cap embodied in Figure 1;

Figure 3 is a view similar to Figure 1, showing a modified bottle cap construction according to the invention;

Figure 4 is an enlarged view of the cap embodied in Figure 3; and

Figure 5 shows a portion of the skirt of the cap of Figures 1 and 3 stretched or developed to a plane surface.

Like reference characters identify like parts in the different views of the drawing.

With the aforementioned and other objects in view, the present invention involves generally the provision of a ring-shaped resilient metallic insert consisting of thin spring metal and being completely embedded in the skirt portion of a bottle cap, to provide both additional mechanical strength and quick-acting resiliency to the cap and to insure a hermetic fit with the neck of a bottle or other container. More particularly, the invention proposes the provision of a thin expansible and contractible ring-shaped metal strip or insert provided with a series of slots or other recesses and being embedded in the thermoplastic material to provide the required mechanical strength and quick-acting spring action of the composite cap structure, which the synthetic material alone lacks.

Other advantages of the invention will be in part obvious and will in part become apparent from the following description and exemplifications, as shown in the drawing.

Referring more particularly to Figures 1 and 2, there is shown at 10 the neck of a bottle such as a milk bottle terminating in a bead 11 to which is applied a cap 12 made of synthetic such as thermoplastic material and held by resilient or spring action independently of any other fastening. The cap 12 has a cylindrical skirt 13 formed with a lower portion 14 of increased thickness to provide added mechanical strength and to enable a quick-acting circumferential expansion or contraction of the cap by the further provision of an elastic or expansible metal ring 15 embedded in the skirt 13, in the manner shown in the drawing.

The normal inner diameter $d$ of the skirt 13 is somewhat less than the outer diameter $d'$ of the bead 11 so that the cap may be applied and forced over the neck of the bottle to snap into position as shown in Figure 1. There is thus provided a cap or contracting member which possesses a greater tendency to urge the skirt 13 to hug the neck of the bottle than exists if a cap of thermoplastic or equivalent material without the expansible and contractible member 15 were used. The inner edge of skirt 13 is advantageously bevelled or rounded as shown in 19 in such a manner that downward pressure on the cap will readily expand and force the skirt over the bead 11 to cause the cap to snap into position instantly.

In the preferred construction as shown in Figure 5, the metal insert 15 takes the form of a thin cylindrical metal ring of spring metal such as steel, phosphor- or beryllium bronze or the like, and being provided with a series of transverse slots 20 and 21 extending alternately to the opposite edges and overlapping each other in the center. In other words, the metal ring or insert is so constructed that there is no longitudinal or circumferential line running continuously through the metal parts, whereby to provide a substantial elasticity or quick-acting spring action in the circumferential direction of the skirt 14, thereby to afford a close and snug fit of the cap and hermetic closure of the bottle.

In the embodiment shown in Figures 3 and 4, the skirt 16 and resilient metallic insert 17 are pre-curved or outwardly vaulted to insure a closer fit around the bead 11 of the neck 10. The insert 17 in this case, as in the case of Figures 1 and 2, may be punched from sheet metal, preshaped and then heat treated to provide the required resiliency. It may be directly molded in the cap or otherwise embedded therein in any suitable manner.

The metal ring 15 or 17 preferably constructed by bending of a metal strip may be completely closed upon itself or formed with a slight gap between its abutting edges in the embedded or molded position of the ring. In either case, the ring will act as a reinforcing member by providing both added mechanical strength and quick-acting resiliency and insuring a hermetic closure in the manner described above.

The metal ring 15 or 17 constructed in the manner described will expand easily when subjected to a force in the peripheral direction, upon applying or forcing the cap onto the neck of a bottle or other container, and return substantially instantly to its original shape upon removal or relaxation of said force. The stiffness or elasticity of the ring for any given material is dependent upon its thickness, cross-section and the number and depth of the slots or other recesses which, according to the invention, must extend beyond the center line or overlap to prevent any longitudinal or circumferential line to run continuously through the metal parts. The ring being permanently set in the plastic material, will be prevented from buckling and is protected by the thermoplastic material against corrosion, oxidation and other influences. This results in long life and various further advantages well understood.

While we have shown and described a desirable embodiment of the invention, it is understood that this disclosure is for the purpose of illustration and that various changes in shape, proportion and arrangement of parts as well as the substitution of equivalent elements and materials for those shown herein and described may be made without departing from the spirit and scope of the invention as defined in the appended claims. The specification and drawing are accordingly to be regarded in an illustrative rather than in a restrictive sense.

We claim:

1. A bottle cap comprising top and skirt portions of moulded plastic material, and a closed cylindrical ring of relatively thin spring metal concentrically moulded in said skirt portion, said ring having a series of relatively closely spaced transverse slots alternately extending to the opposite edges thereof and overlapping each other i the center, to increase the resiliency of said skirt in the circumferential direction, to thereby effect a hermetic and permanent seal by elastic pressure when said cap is forced over the mouth of a bottle.

2. A bottle cap comprising top and cylindrical skirt portions of moulded thermoplastic material, and a closed concentric cylindrical ring of flat relatively thin spring metal moulded in said skirt portion, said ring having a series of relatively closely spaced transverse slots alternately extending to the opposite edges thereof and overlapping each other in the center, to increase the resiliency of said skirt portion in the circumferential direction, to thereby effect a hermetic and permanent seal by elastic pressure when said cap is forced over the mouth of a bottle.

3. A bottle cap comprising a moulded thermoplastic top portion and a cylindrical skirt portion of greater thickness, and a closed concentric cylindrical ring of flat relatively thin spring metal moulded in said skirt portion, said ring having a series of relatively closely spaced transverse slots alternately extending to the opposite edges thereof and overlapping each other in the center, to increase the resiliency of said skirt portion in the circumferential direction, to thereby effect a hermetic and permanent seal by elastic pressure when said cap is forced over the mouth of a bottle.

4. A bottle cap comprising a top portion and an outwardly curved skirt portion consisting of moulded thermoplastic material, and a closed curved cylindrical ring of relatively thin spring metal being moulded in said skirt, said ring having a series of relatively closely spaced transverse slots alternately extending to the opposite edges thereof and overlapping each other in the center, to increase the resiliency of said skirt portion in the circumferential direction, to thereby effect a hermetic and permanent seal if said cap is forced over the mouth of a bottle.

IRVING ROSSI.
WILLIAM DUBILIER.

REFERENCES CITED

The following references are of record in the file of this patent:

UNITED STATES PATENTS

| Number | Name | Date |
|---|---|---|
| 267,349 | Hupfel | Nov. 14, 1882 |
| 1,168,608 | Davis | Jan. 18, 1916 |
| 1,183,728 | Griffith | May 16, 1916 |
| 1,616,950 | Burdette | Feb. 8, 1927 |
| 1,905,356 | West | Apr. 25, 1933 |
| 2,030,059 | Ferngren | Feb. 11, 1936 |
| 2,074,830 | Conner | Mar. 23, 1937 |
| 2,214,842 | Sweet | Sept. 17, 1940 |
| 2,445,889 | Rossi et al. | July 27, 1948 |

FOREIGN PATENTS

| Number | Country | Date |
|---|---|---|
| 27,731 | Netherlands | May 16, 1931 |